United States Patent [19]

Furukawa

[11] Patent Number: 5,563,451
[45] Date of Patent: Oct. 8, 1996

[54] POWER SUPPLY APPARATUS INSTALLED UNDER A PLATFORM OF A VEHICLE

[75] Inventor: Kazutoshi Furukawa, Tokyo, Japan

[73] Assignee: Aichi Sangyo Co. Ltd., Tokyo, Japan

[21] Appl. No.: 427,661

[22] Filed: Apr. 24, 1995

[51] Int. Cl.⁶ ........................................ F16H 35/06
[52] U.S. Cl. ............... 307/10.1; 180/65.4; 180/53.8; 74/15.63; 74/15.66; 307/47; 307/57; 290/4 R
[58] Field of Search .................. 180/65.3, 65.4, 180/165, 14.3, 53.1, 53.6, 53.61, 53.62, 53.8; 307/9.1, 10.1, 10.7, 67, 84, 47, 57; 322/7, 44, 10, 12; 74/11, 15.2, 15.4, 15.6, 15.63, 15.66, 15.69; 290/4 R, 4 A, 1 R, 1 C; 363/143

[56] References Cited

U.S. PATENT DOCUMENTS

| | | | |
|---|---|---|---|
| 2,317,957 | 4/1943 | Frudden | 74/15.66 |
| 3,635,176 | 1/1972 | Gottlieb | 110/222 |
| 3,660,671 | 5/1972 | Peterson | 290/1 R |
| 3,882,950 | 5/1975 | Strohlein | 180/165 |
| 4,262,209 | 4/1981 | Berner | 307/47 |
| 4,268,787 | 5/1981 | Sloan | 307/10.1 |
| 4,488,447 | 12/1984 | Gebhardt | 74/15.63 |
| 4,649,288 | 3/1987 | Barry et al. | 322/10 |
| 4,661,714 | 4/1987 | Satterthwaite et al. | 290/4 R |
| 4,686,375 | 8/1987 | Gottfried | 290/4 R |
| 4,785,227 | 11/1988 | Griffin | 290/4 R |
| 4,857,755 | 8/1989 | Comstock | 307/47 |
| 5,199,912 | 4/1993 | Dade et al. | 290/1 R |
| 5,249,637 | 10/1993 | Heidl et al. | 180/65.4 |
| 5,267,477 | 12/1993 | Irikura et al. | 74/15.6 |
| 5,300,819 | 4/1994 | Lee | 307/47 |
| 5,309,778 | 5/1994 | Antonov | 74/15.86 |
| 5,369,352 | 11/1994 | Toepfer | 363/143 |
| 5,423,407 | 6/1995 | Nikolic | 194/217 |

FOREIGN PATENT DOCUMENTS

| | | |
|---|---|---|
| 54-57117 | 5/1979 | Japan . |
| 58-175999 | 10/1983 | Japan . |
| 60-261398 | 12/1985 | Japan . |

*Primary Examiner*—William M. Shoop, Jr.
*Assistant Examiner*—Peter Ganjoo
*Attorney, Agent, or Firm*—Price, Heneveld, Cooper, DeWitt & Litton

[57] ABSTRACT

A power supply apparatus comprises a generator (5) that can generate electric power used for welding, lighting, and electric tools and is installed under a load carrying platform (2) of a vehicle (1), a speed-increasing gear (3) that is installed at one side of the generator (5), a power switchboard (4) that is installed at the other side of the generator (5) as integral with the generator (5), and a propeller shaft (14) connecting a side PTO (12) installed on a transmission case (13) to the speed-increasing gear (3).

8 Claims, 1 Drawing Sheet

POWER SUPPLY APPARATUS INSTALLED UNDER A PLATFORM OF A VEHICLE

BACKGROUND OF THE INVENTION

1. Field of the Invention

The present invention relates to a power supply apparatus that is installed under a platform of a vehicle having a side PTO (Partial Transmission Outlet).

2. Description of the Related Art

In conventional vehicles, generators that generate only the specific voltage such as 12 V or 24 V necessary for driving the vehicles are installed.

Since conventional generators installed on vehicles are used for driving the vehicles, they cannot be used for fieldwork such as sheetmetal, steelframe fabrication in the open air where electric power is not available. Therefore, when fieldwork is performed, a power switchboard and a generator required for fieldwork should be loaded on a platform of a vehicle. Thus, another vehicle becomes necessary for loading tools necessary for the fieldwork. Accordingly, conventional generators have the problem that they are much more costly and consume extreme amounts of time.

The object of the present invention is: to enable all work, in which a power supply is used in the open air where electric power is not available, such as sheetmetal, steelframe fabrication, and lighting for civil engineering works or construction works to be performed; to eliminate the need that apparatuses such as a power switchboard and a generator are loaded on a platform of one vehicle and tools necessary for fieldwork are loaded on another vehicle; and to enable a platform space to be used widely and effectively in case the platform is not occupied by a conventional generator.

In order to attain the above object, in a vehicle having a side PTO according to the present invention, a generator that can generate electric power for welding, lighting, and electric tools is installed under the platform of the vehicle. In addition, a speed-increasing gear is installed at one side of the generator, and at the other side of the generator, a power switchboard is installed as integral with the generator. Furthermore, the side PTO installed on a transmission case is connected to the speed-increasing gear with a propeller shaft.

Moreover, the power switchboard is provided with three types of connector receptacles, one of which is a receptacle for welding and has a thumbwheel for regulating current.

SUMMARY OF THE INVENTION

A transmission sequence of rotary motion generated by an engine is installed by the side PTO on the transmission case, and includes a propeller shaft, speed-increasing gear, and generator that receives the rotary motion having a speed accelerated by the speed-increasing gear.

The power switchboard receives electricity generated by this generator and distributes the electricity for outdoor jobs such as sheetmetal and steelframe fabrication.

The side PTO receives the rotary motion by a vehicle when the vehicle stops (in neutral position).

On the other hand, the speed-increasing gear increases the speed of the rotary motion originated by the engine, and increases the rotation speed and electric power of the generator. Therefore, since the rotation of the engine can be kept low, the noise by the engine can be reduced.

By using this speed-increasing gear, the generator can generate ample electric power for welding (nearly 5.4 kW), lighting (nearly 3 kW), electric tools (nearly 3 kW), and the like.

The power switchboard that receives electricity generated by the generator is provided with three types of receptacles: a receptacle of a 200-V 50/60-Hz power supply for electric tools; a receptacle of a 100-V 50/60-Hz power supply for lighting and home use; a receptacle of a power supply for welding. Therefore, a power supply suitable to objectives can be selected, and, the receptacle for welding is provided with a thumbwheel for regulating current.

DETAILED DESCRIPTION OF THE PREFERRED EMBODIMENT

An embodiment according to the present invention will be explained with reference to drawings.

Figure 1:
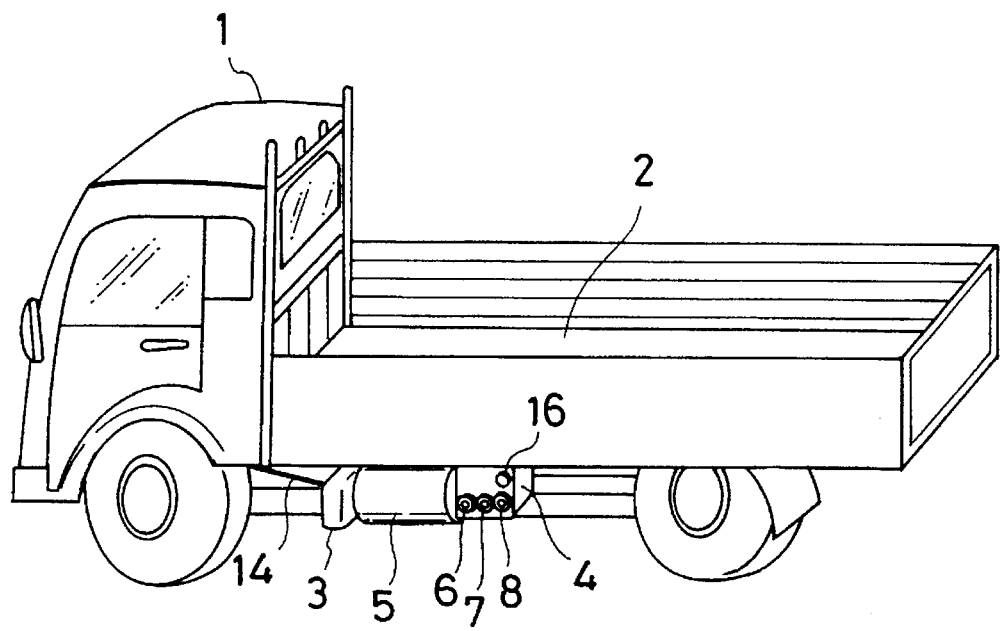
FIG. 1 is a perspective view showing a power supply apparatus according to the present invention that is installed under a platform of a vehicle.

FIG. 1 shows a vehicle, such as a truck 1 having a speed-increasing gear 3, a generator 5, and a power switchboard 4.

The speed-increasing gear 3, generator 5, and power switchboard 4 are installed under a platform of the truck 1. Namely, after fastening a frame with bolts on a transmission case 13 of the truck 1, the speed-increasing gear 3, generator 5, and power switchboard 4 are installed under the frame (not shown).

Figure 2:
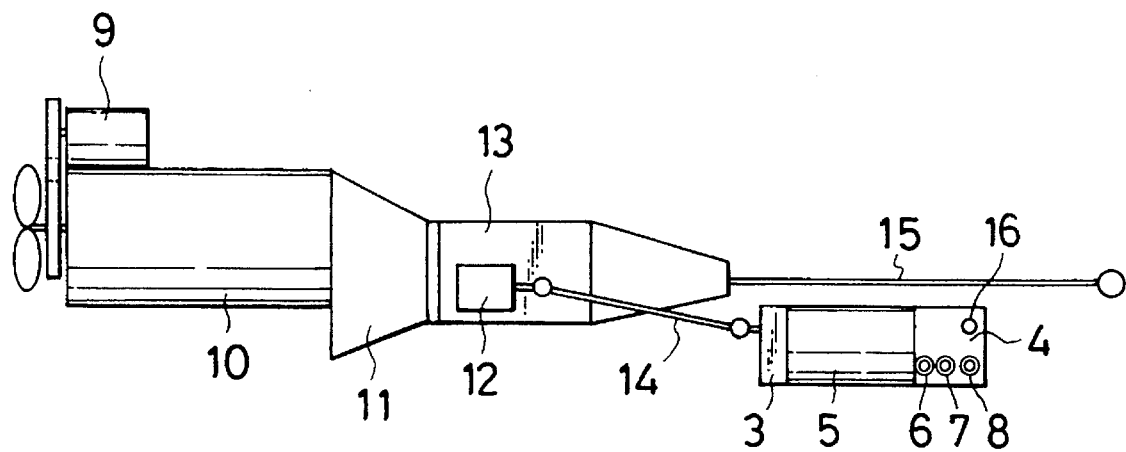
FIG. 2 is a schematic diagram showing an embodiment of a power supply apparatus according to the present invention.

As shown in FIG. 2, the side PTO 12 is installed on the transmission case 13.

This side PTO 12 receives rotary motion generated by an engine 10 for driving the truck 1 when the vehicle stops, that is, when a clutch 11 is in a neutral state. On the other hand, when the vehicle 1 is driven, the side PTO does not receive the rotary motion, but instead a propeller shaft 15 receives that for rotation of tires.

By connecting the side PTO 12 to the speed-increasing gear 3 with the propeller shaft 14, the generator 5 receives the rotary motion generated by the engine 10 that the side PTO 12 has received.

In this case, since the generator 5 receives the rotary motion accelerated by the speed-increasing gear 3, the generator 5 can generate high electric power whilst the engine noise is much less than in the conventional case so as to lessen noise problem.

In this manner, the generator 5 can generate high electric power, and hence the generator 5 can supply the electric power for welding (nearly 5.4 kW), lighting (nearly 3 kW), electric tools (nearly 3 kW), and the like.

This generator 5 and power switchboard 4 are connected with a sole-purpose cable and are installed together as integral, and the power switchboard is provided with three types of receptacles 6, 7, and 8: a receptacle of a 200-V 50/60-Hz power supply for electric tools; a receptacle of a 100-V 50/60-Hz-power supply for lighting and home use; a receptacle of a power supply for welding. In addition, the receptacle 8 for welding has a thumbwheel 16 for regulating current.

Therefore, power output suitable to the purpose can be selected among these three types of receptacles 6, 7, and 8, and current can be regulated with a thumbwheel 16.

The present invention has following advantages, because the present invention is constituted as described above.

By use of an embodiment according to the present invention in an open worksite where electric power is not available, it can perform all work, which requires power supply, such as sheetmetal and steelframe fabrication including welding, drilling, etc., and lighting at night. Consequently, the saving of labor, man-hours, etc. can be attained.

Furthermore, since it becomes unnecessary to load an 'at site' power supply such as a generator conventionally carried on a vehicle under this invention, a second truck is no longer needed to carry the generator to worksite. Therefore, reduction of tools load, expenses, labor and man-hours can be attained.

Moreover, a platform space can be used effectively now that the space is not occupied by a generator.

In addition, when a power supply apparatus according to the present invention is installed in a motor-home, the power supply apparatus can be used as a power supply for a TV set, a refrigerator, etc.

What is claimed is:

1. A mobile power supply apparatus comprising:
   a motorized vehicle including a chassis, with an engine transmission and a body mounted on said chassis;
   a generator adapted to generate electric power used for electric tools and equipment, said generator mounted under said body of the vehicle;
   a speed-increasing gear coupled to one side of said generator;
   a power switchboard coupled to the other side of the generator from said one side and integral with said generator, said power switchboard including at least one power outlet receptacle adapted to be selectively coupled to an electric cable;
   a side partial transmission outlet coupled to said engine transmission; and
   a propeller shaft operably connecting said side partial transmission outlet to said speed-increasing gear.

2. A mobile power supply apparatus according to claim 1, wherein said power switchboard comprises three power outlet receptacles, including an approximately 100-volt receptacle, an approximately 200-volt receptacle, and a welding receptacle operably coupled through a thumbwheel adapted for regulating current.

3. A mobile power supply apparatus according to claim 1, wherein said power switchboard comprises a plurality of said power outlet receptacles.

4. A mobile power supply apparatus according to claim 3, wherein said plurality of said power outlet receptacles comprises a 110-volt outlet receptacle, a 220-volt outlet receptacle, and an adjustable current outlet receptacle.

5. A mobile power supply apparatus according to claim 1, wherein said motorized vehicle is a truck having a bed mounted on said chassis and wherein said generator is mounted under said bed of the truck.

6. A mobile power supply apparatus according to claim 5, wherein said power switchboard comprises a plurality of said electric power outlets.

7. A mobile power supply apparatus according to claim 6, wherein said plurality of said electric power outlets comprises an approximately 100-volt outlet, an approximately 200-volt outlet, and an adjustable current outlet.

8. A mobile power supply apparatus according to claim 6, wherein said plurality of said electric power outlets comprises a 110-volt outlet, a 220-volt outlet, and an adjustable current outlet.

\* \* \* \* \*